(12) United States Patent
Safa

(10) Patent No.: US 7,162,735 B2
(45) Date of Patent: Jan. 9, 2007

(54) DIGITAL DATA PROTECTION ARRANGEMENT

(75) Inventor: John Aram Safa, Nottingham (GB)

(73) Assignee: Simplex Major Sdn.Bhd, Selangor DE (MY)

( * ) Notice: Subject to any disclaimer, the term of this patent is extended or adjusted under 35 U.S.C. 154(b) by 932 days.

(21) Appl. No.: 09/905,571

(22) Filed: Jul. 13, 2001

(65) Prior Publication Data

US 2002/0038428 A1    Mar. 28, 2002

(30) Foreign Application Priority Data

Jul. 18, 2000  (GB) .................... 0017481.3
Feb. 7, 2001  (GB) .................... 0102982.6

(51) Int. Cl.
*G00F 17/30*    (2006.01)

(52) U.S. Cl. .................. 726/6; 726/21; 726/27

(58) Field of Classification Search ............... 713/200, 713/190–193; 726/3, 21, 27, 6
See application file for complete search history.

(56) References Cited

U.S. PATENT DOCUMENTS

| | | | |
|---|---|---|---|
| 4,120,030 A | 10/1978 | Johnstone | |
| 4,525,599 A | 6/1985 | Curran et al. | |
| 4,633,388 A | 12/1986 | Chiu | |
| 4,634,807 A | 1/1987 | Chorley et al. | |
| 4,847,902 A | 7/1989 | Hampson | |
| 4,888,802 A | 12/1989 | Cooney | |
| 5,081,675 A | 1/1992 | Kittirutsunetorn | |
| 5,224,166 A | 6/1993 | Hartman, Jr. | |
| 5,666,411 A | 9/1997 | McCarty | |
| 5,982,887 A | 11/1999 | Hirotani | |
| 5,995,623 A | 11/1999 | Kawano et al. | |
| 6,006,328 A | 12/1999 | Drake | |
| 6,052,780 A | 4/2000 | Glover | |
| 6,185,686 B1 | 2/2001 | Glover | |

FOREIGN PATENT DOCUMENTS

| | | |
|---|---|---|
| EP | 0 191 162 | 2/1993 |
| EP | 0 727 746 | 8/1996 |
| EP | 0 768 601 | 4/1997 |
| EP | 0 706 118 | 3/2000 |
| GB | 2 140 592 | 11/1984 |
| GB | 2330 932 | 5/1999 |
| WO | 00/26791 | 5/2000 |
| WO | 01/08345 | 2/2001 |

OTHER PUBLICATIONS e-NeXSh: achieving an effectively non-executable stack and heap via system-call policing Kc, G.S.; Keromytis, A.D.; Computer Security Applications Conference, 21st Annual Dec. 5-9, 2005 pp. 15.*

(Continued)

*Primary Examiner*—David Jung
(74) *Attorney, Agent, or Firm*—Smith-Hill and Bedell

(57) ABSTRACT

When software is initially loaded to RAM 20, an engine 30A is installed at the beginning of an otherwise empty area of RAM 20. When the protected application is called, the engine first creates a series of steps (FIG. 3D), including a CALL command to a protection block 38. On reaching the call 36, the protection block 38 is executed, to complete various security checks. If these are successful, step 2 is created and written over the call 36 so that execution of steps 2 and 3 can continue as normal. Consequently, the protected software (steps 1, 2 and 3) is not exposed to scrutiny unless the security checks have successfully been completed.

40 Claims, 9 Drawing Sheets

OTHER PUBLICATIONS

Managing system and active-content integrity Michener, J.R.; Acar, T.; Computer vol. 33, Issue 7, Jul. 2000 pp. 108-110.*

A method for detecting obfuscated calls in malicious binaries Arun Lakhotia; Eric Uday Kumar; Venable, M.; Software Engineering, IEEE Transactions on vol. 31, Issue 11, Nov. 2005 pp. 955-968.*

* cited by examiner

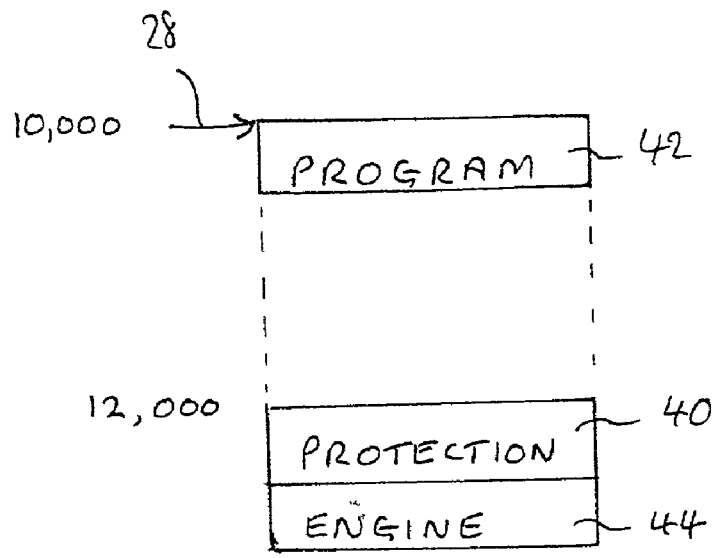
FIG 5.a
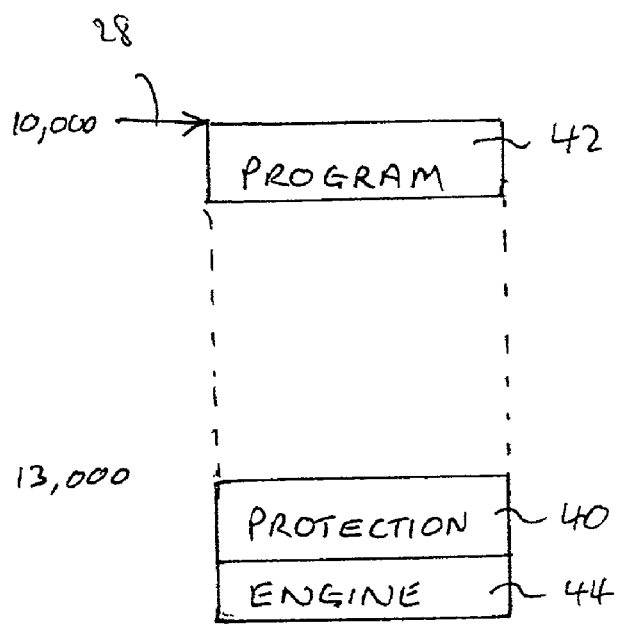
FIG 5.b

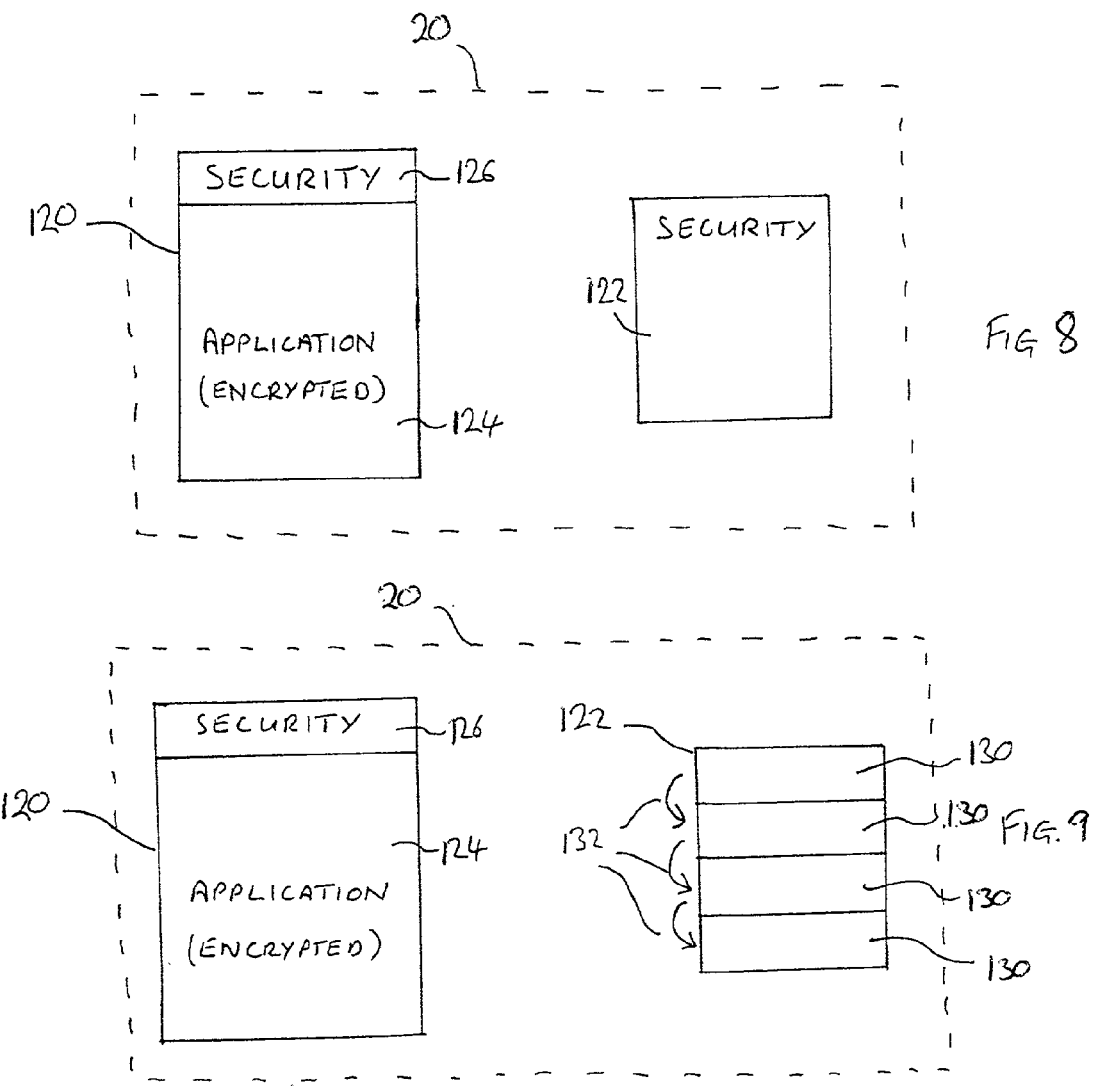

DIGITAL DATA PROTECTION ARRANGEMENT

This application claims priority under 35 USC 119 of United Kingdom Patent Application No. 0017481.3 filed Jul. 18, 2000 and United Kingdom Patent Application No. 0102962.6 filed Feb. 7, 2001.

The present invention relates to protection arrangements for digital data.

Digital data, including software files and data files, may need protection for various reasons. For instance, protection may be required against unauthorised copying. In the case of software, protection may be required against corruption by virus attack, hacking or the like.

The invention seeks to provide an improved protection arrangement for digital data.

The invention provides a digital data protection arrangement comprising executable code which incorporates sufficient information relating to the protected data to be able to create, when executed, further code which contains the protected data in usable form.

The arrangement may comprise security means operable to detect corruption of the protected data, the further code incorporating at least one instruction to call the security means to assess any corruption. Preferably the call instruction is contained within the further code at the required location of a set of executable code, and wherein the security means is operable to recreate the set of executable code when executed, to replace the call instruction. The security means is preferably operable to delete the further code in the event that any corruption is detected.

The arrangement may further comprise relocation means operable to change the location of the security means and to modify the call instruction to refer to the new location. The relocation means may be contained within the protected data, to operate repeatedly while the protected code is in use.

The executable code may contain executable instructions for creating the protected code. Execution of the executable code preferably installs the decryption instructions for execution, subsequent execution of the decryption instructions causing decryption of the protected data. The decryption instructions may be stored initially in non-executable form and which requires execution to authorise execution of the protected software, the arrangement further including conversion means operable to convert the said block of code to an executable form by means of an algorithm which requires at least one conversion key, and further operable to derive a conversion key, for use in the algorithm, by reference to a target block of code which is in executable or nonexecutable form, whereby an appropriate conversion key will be derived only if the target block is unmodified.

The security means may comprise a plurality of blocks of executable code stored in non-executable form and each of which requires execution to authorise execution of the protected software, the conversion means being operable to convert each block to executable form. Conversion of each block is preferably achieved by a conversion key derived from a respective target block. At least one block is preferably operable, upon execution, to convert another block to an executable form for subsequent execution. Each block is preferably operable, upon execution, to convert another block to an executable form for subsequent execution.

The or each target block may be contained within the protected software or within the first security means.

The or each algorithm for converting code may include a CRC algorithm. The executable code may incorporate the protected data in encrypted form, together with executable instructions for decryption. The protected data may contain executable code and/or a data file. The arrangement may comprise processing means operable to execute code, and memory means within which the said executable code is stored, the executable code being stored in the memory means with a start point at a memory location indicated within the arrangement as the start point for the protected data, whereby the processor means will cause the said executable code to be executed when seeking to access the protected data. The executable code is preferably operable to recreate the protected data in substantially unencrypted form.

The protected data may contain at least one executable instruction which contains a plurality of steps, the steps being executable in more than one order to implement the instruction, and the executable code being operable to create the instruction by creating the steps in an order which changes on each execution of the executable code. The order of the steps is preferably chosen substantially at random on each execution. The steps may include at least one step which initiates the operation of security means operable to detect corruption of the protected data. The executable code may be executed to create the steps on each occasion that the executable instruction is to be executed.

The executable code may be arranged to provide, upon each execution, a part of the protected data in usable form and other data in corrupt form, whereby more than one execution is required to provide the whole of the protected data in usable form. Each part may correspond with a complete executable routine within the protected data, whereby a complete set of routines forming the protected data can be created by repeated execution of the executable code. Each execution of the executable code preferably causes previously created usable code to be corrupted, whereby only the code created by the most recent execution will be in usable form during operation of the arrangement.

The invention also provides a computer system comprising memory means containing a digital protection arrangement according to any of the preceding definitions.

The invention also provides a data carrier containing software which, when installed on a computer system, is operable as a digital data protection arrangement in accordance with any of the preceding definitions.

The invention also provides computer software which, when installed on a computer system, is operable as a digital data protection arrangement in accordance with any of the preceding definitions.

The invention also provides computer software operable to provide protection for a second item of computer software, the protection software comprising security means operable to authorise execution of the protected software in response to successful completion of one or more security checks, and having at least one block of executable code which is stored in non-executable form and which requires execution to authorise execution of the protected software, and the protection software further comprising conversion means operable to convert the said block of code to an executable form by means of an algorithm which requires at least one conversion key, the conversion means being further operable to derive a conversion key, for use in the algorithm, by reference to a target block of code in executable or non-executable form, whereby an appropriate conversion key will be derived only if the target block is unmodified.

The invention also provides a computer memory device containing computer software as set out above.

The invention also provides a computer system containing an item of computer software protected by means of computer software as set out above.

Examples of the present invention will now be described in more detail, by way of example only, and with reference to the accompanying drawings, in which:

FIG. 5 illustrates the use of RAM in accordance with the present invention and incorporating embedded security procedures.

FIG. 8 is a schematic diagram of the contents of RAM in a system implementing a further example of the invention using a separate security block;

Figure 1:
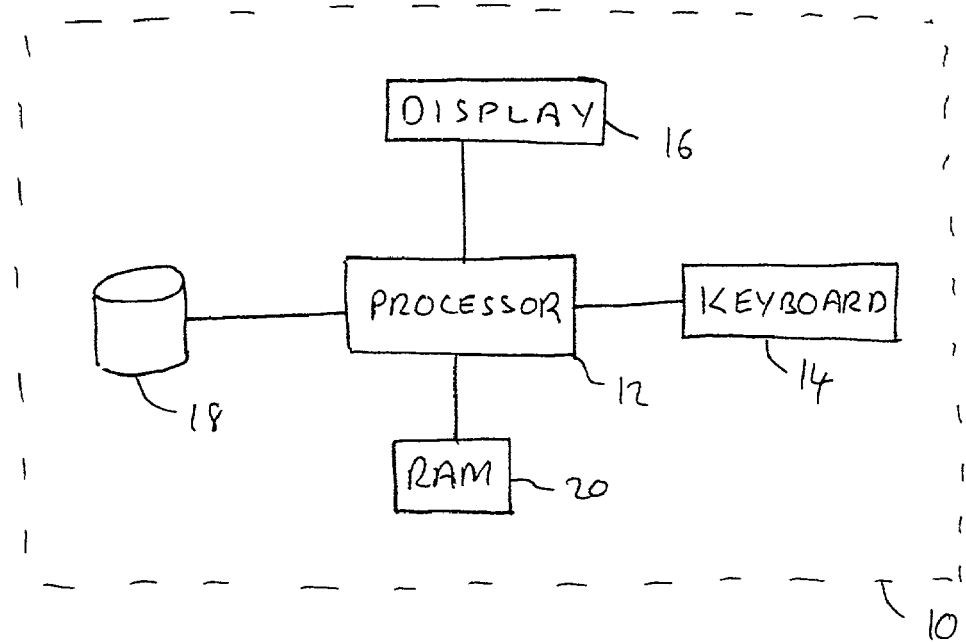
FIG. 1 illustrates, in a highly simplified form, a computer system for use in implementing the present invention.
Figure 10:
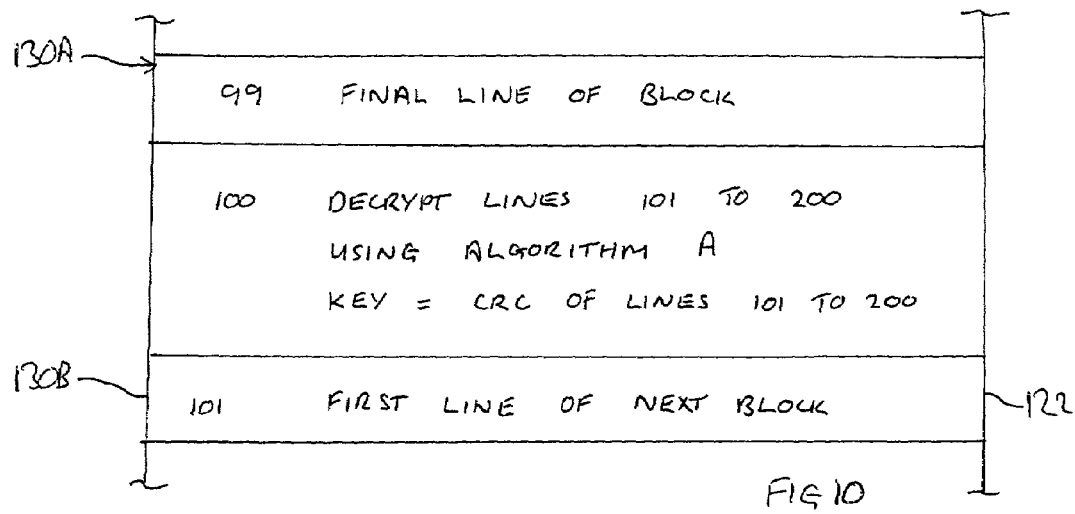
Figure 11:
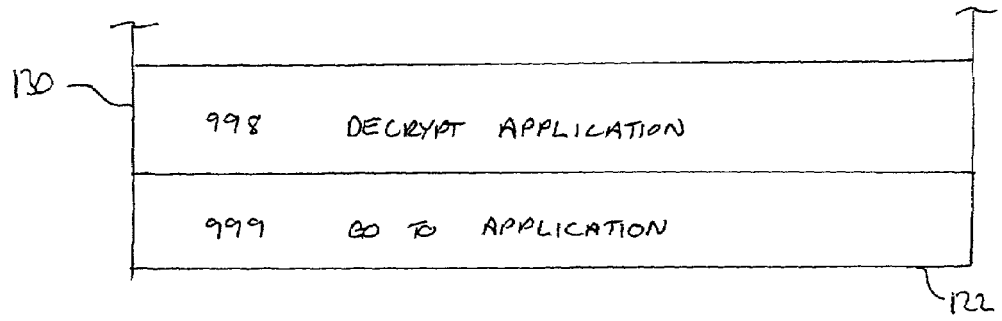

FIG. 9 corresponds with FIG. 8, showing an alternative to the example of FIG. 8;

FIG. 10 schematically illustrates part of the listing of the security software of FIGS. 8 and 9;

FIG. 11 schematically illustrates the end of the listing of the security software of FIGS. 8 and 9; and FIG. 12 schematically illustrates a further form of implementation of the invention;

In order to explain the invention, it is useful first to describe briefly a simple computing arrangement with which the present invention may be implemented. FIG. 1 shows a computing arrangement 10 which consists of conventional hardware components, including a processor 12 to which appropriate input and output devices are connected, such as a keyboard 14 and a display 16. Memory is provided in the form of a hard drive 18, or similar bulk memory device, and in the form of RAM (Random Access Memory) 20, for use by the processor 12 during the execution of software. The arrangement may be of the type known as an IBM PC, or equivalent or similar machine.

Figure 2:
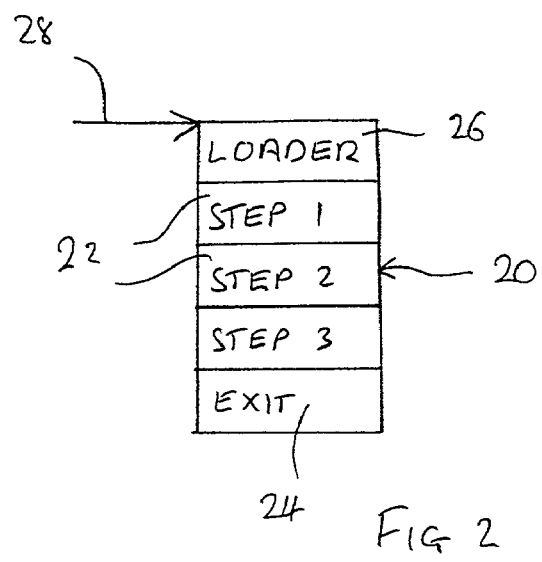
FIG. 2 is a highly schematic representation of a known arrangement for storing software in RAM.

FIG. 2 illustrates how RAM 20 is conventionally used to run software stored on the drive 18 of an arrangement 10. Initially, the software is loaded by the processor 12 from the drive 18 into RAM 20, resulting in a sequence of machine code steps 22 (illustrated as STEP 1, STEP 2 etc.), stored in sequence in the RAM 20. The sequence of steps ends with an EXIT instruction 24. It will be appreciated that in a practical example, the number of steps may vary from that shown, and will usually be very much greater in number.

The first step, STEP 1, is conventionally preceded by a LOADER block of code 26 which, when executed, causes other resources to be identified and made available to the software in the RAM, such as drivers for input/output devices 14, 16, or other software resources commonly shared by various different application programs.

In the course of loading the software to the form illustrated in FIG. 2, the processor 12 of the arrangement 10 will record a start point for the block of executable data illustrated, i.e. the memory location in the RAM 20 at which the LOADER 26 begins. The noting of this start point is illustrated schematically in FIG. 2 (and in other FIGS) by the use of an arrow 28.

When the arrangement 10 is instructed to run the software now contained within the RAM 20, the processor 12 first goes to that location of the RAM 20 which is identified as the start point 28 and begins to execute the executable data found at that location. Thus, the processor 12 will first execute the LOADER 26, followed by the steps 22, eventually finishing at the EXIT step 24.

It is apparent from FIG. 2 that the software in the RAM 20 is exposed in unencrypted form and is therefore vulnerable to attack by virus software, to unauthorised copying, or to analysis by a malevolent user seeking to attack the software by virus creation or otherwise.

EXAMPLE 1

FIG. 3 illustrates a basic arrangement according to the invention, by which the protection of the software is improved. FIG. 3A illustrates the state of the RAM 20 when software protected in accordance with the invention is first loaded from the drive 18.

Figure 3A:
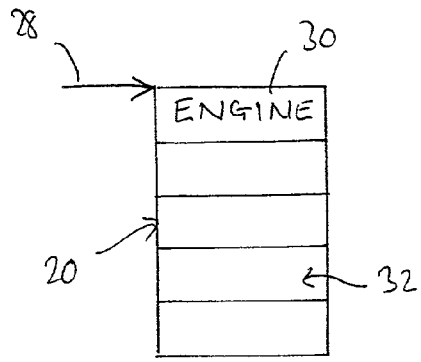
FIG. 3 illustrates the use of RAM in accordance with the present invention.

In the condition of FIG. 3A, the RAM 20 contains an initial block of executable code called here an ENGINE 30 and located at the start point 28 noted by the processor 12 for the protected software Below the ENGINE 30 the RAM 20 is empty at 32.

The ENGINE 30 is executable code, as has been stated. However, the ENGINE 30 is not executable to implement the protected software. Instead, the engine 30 is executable in order to recreate the protected software and write this into the empty region 32 of the RAM 20 when the ENGINE 30 is executed. Thus, in a simple form, the ENGINE 30 may consist of an encrypted version of the protected data (or addresses at which an encrypted version is available), together with executable software for decrypting the software and writing it to the region 32.

It is to be clearly understood that in this document, the term encryption and related terms refer to any technique, including compression, by which data is converted from its usable form into another form which is not immediately executable. Decryption and related terms are used to refer to the reverse process, including the process of decompression.

It is to be noted in FIG. 3A that the engine 30 is situated at the start point 28. Consequently, when the protected software is called, the processor 12 will first go to the location 28 and thus begin to execute the code which forms the ENGINE 30. Initially therefore, the protected software will be recreated in unencrypted form to fill the space 32, as illustrated in FIG. 3B.

Figure 3B:
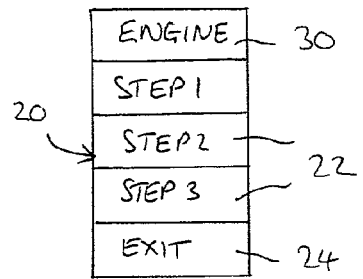

As the processor 12 continues to execute the ENGINE 30, the program pointer will eventually reach the beginning of STEP 1, illustrated at 34 in FIG. 3B, by which time, STEP 1 and the remainder of the protected data will have been recreated in the space 32, so that execution of the protected software will then commence.

It will be realised that the execution of the ENGINE 30 constitutes an additional step in comparison with the conventional arrangement illustrated in FIG. 2. However, it is envisaged that the operation of the ENGINE 30 in machine code will be sufficiently swift to prevent this extra step being noticeable to a user.

Having explained this basic operation as illustrated in FIG. 3, it can be seen that the protected data is less vulnerable to copying or analysis than in the conventional arrangement in FIG. 2. This is because the protected data is not available for attack, copying or analysis until the ENGINE 30 has executed, i.e. until the protected software has been called. Simply loading the protected data from the drive 18 to the RAM 20 is not sufficient to expose the protected data to attack, copying or analysis.

While the arrangements of FIGS. 3A and 3B improve on the arrangement of FIG. 2, it is apparent that once the ENGINE 30 has run, the protected data is then exposed at FIG. 3B in the same manner as it was exposed once in RAM in the form of FIG. 2. In order to further improve the protection, the ENGINE 30 can be modified to recreate data in the space 32 in the following manner.

EXAMPLE 2

Figure 3C:
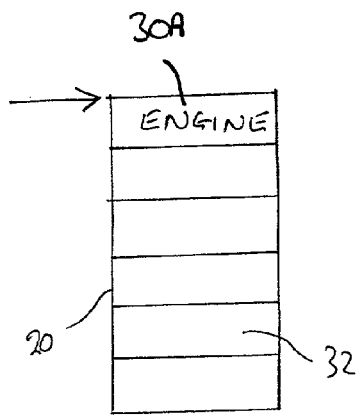
Figure 3D:
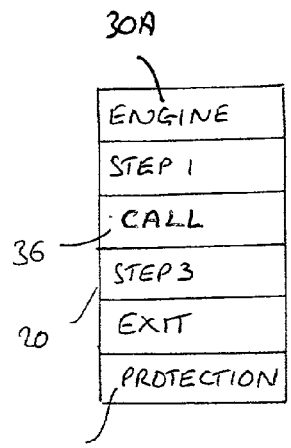
Figure 3E:
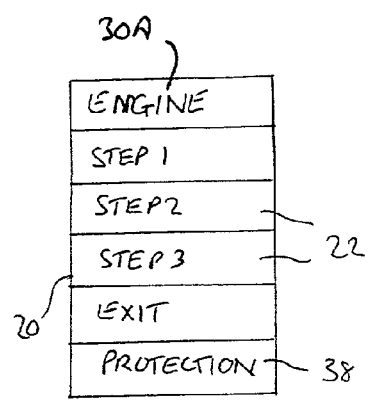

In the example of FIG. 3C to 3E, the RAM 20 initially contains only an ENGINE, labelled 30A in this example, and empty RAM 32, as illustrated in FIG. 3A. Execution of the ENGINE 30A again fills the space 32. However, two changes are evident by comparison of FIG. 3D and FIG. 3B. First, STEP 2 has been replaced by a CALL instruction 36, and a PROTECTION block 38 has been inserted by the ENGINE 30A after the EXIT instruction 24. This is achieved in the following manner.

While the ENGINE 30A is running to decrypt the protected data, the ENGINE 30A monitors the resulting decrypted code, looking for certain patterns or sequences of code. Further details of this will be explained below, in relation to Example 3. The ENGINE 30A may be looking for one sequence or more than one sequence. Naturally, the length of the sequence being sought will affect the likelihood of the sequence being located. In this example, the ENGINE 30A is looking for a sequence which corresponds with STEP 2. When this predetermined set of code is located, in this case STEP 2, the ENGINE 30A does not write the predetermined set of code, but instead, writes a CALL instruction 36, instructing the PROTECTION block 38 to be called. Consequently, when the ENGINE 30A has run, the protected data is not fully visible, there being a CALL instruction 36 in place of STEP 2.

When the protected software runs, the program will, at some point, reach the location at which STEP 2 would be expected to begin, and will see the CALL instruction 36. Execution of the PROTECTION block 38 then begins. The block 38 has two functions. In one, code for STEP 2 will be created (in a manner similar to the operation of the engine 30) and written over the CALL instruction 36, so completing the decryption of the protected code. The block 38 will also make security checks, such as by consulting conventional virus protection or the like, to ensure that the virus protection has properly run and that no corruption has been detected. In the event that nothing is amiss, the protection block 38 finishes, returning execution to the location from which the call to the protection block 38 occurred. That location is now the start of code for STEP 2. Operation then continues in the normal way, beginning with STEP 2.

Again, it is envisaged that by operating entirely in machine code, this additional step can be so fast as to be unnoticeable to a user.

It can thus be understood that the protected code does not become fully decrypted until the code is running, thus significantly reducing the risk of virus attack, unauthorised copying or malevolent analysis.

If the PROTECTION block 38 finds something amiss when checking, appropriate retaliation may be implemented. In a simple examples particularly effective against virus attack, the block 38 will delete the version of the protected data contained in the RAM 20 (i.e. the whole of the contents of section 32 of the RAM), thereby deleting the virus or effects of a virus which has contaminated the protected code.

It will be apparent that when operating in machine code and in a realistic situation involving very many lines of code, many CALL instructions 36 may be created by the ENGINE 30A and at locations which will be difficult for a malevolent watcher to predict or to distinguish from call instructions conventionally found within a complex block of machine code. It therefore becomes much more difficult for a malevolent watcher to analyse the operation of the protection, or for a virus to disable that protection. This protection can be further enhanced by having the engine 30A watch for a block of code which itself changes, perhaps each time a CALL instruction is inserted, thus making the insertion of the call instructions pseudo-random to the outside observer.

EXAMPLE 3

Figure 4A:
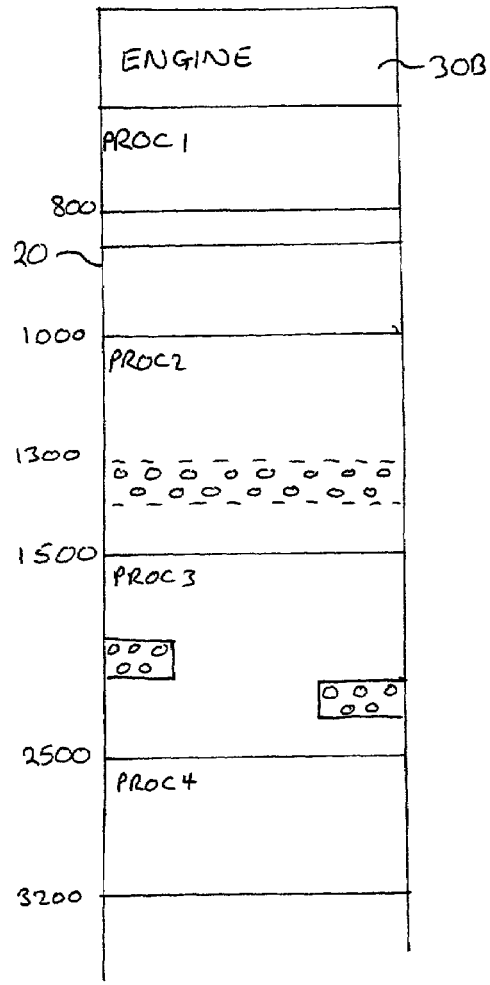
FIG. 4 illustrates the use of RAM in accordance with the present invention and incorporating a relocation arrangement.
Figure 4B:
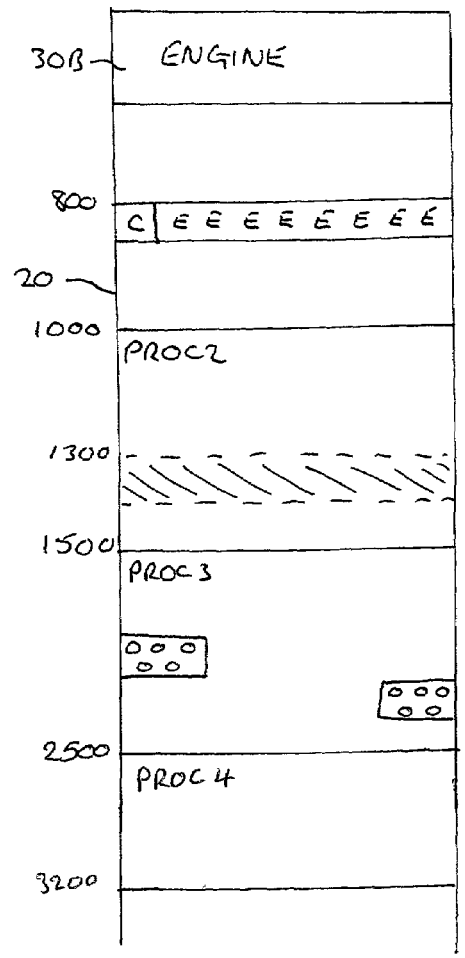

FIGS. 4A and 4B illustrate a protection arrangement with some similarities to the arrangements of FIGS. 3C, D and E, but providing additional security, as follows.

Whereas the arrangement of example 2 uses a block 38 which is separately identifiable, being located at the end of the block being protected, this example makes use of a block operating in a similar manner to the block 38, but embedded within the software being protected. This embedding process can be explained by first considering FIG. 4A. FIG. 4A illustrates the RAM 20 when the engine (this time labelled 30B) has created many lines of code of the protected software, but has not yet completed execution, and has not yet created protection corresponding with the block 38. While FIG. 4A is also diagrammatic, it shows the state of the RAM 20 in more detail than is shown in FIGS. 3C to 3E. In particular, numbers are shown to the left of the RAM 20, indicating the line numbers of the corresponding machine code listing, representing the boundaries between various procedures provided by the machine code, these boundaries also being represented by lines which partition the RAM 20. Thus, below the engine 30B, a code for a first process PROC 1 extends down to line 1,000, followed by code for a second process PROC 2 down to line 1,500, a third process PROC 3 down to line 2,500 and finally a fourth process, PROC 4, down to line 3,200.

In order to complete its execution, the engine 30B seeks to insert instructions which correspond with the block 38 into the RAM 20, between the engine 30B and the end of the list at line 3,200. This is achieved by first looking through the contents of the RAM 20, to identify regions which contain no data. While the processes PROC 1 etc, are shown as contiguous within the RAM 20, areas of memory will nevertheless contain no data for various reasons. In particular, assembler and compiler software commonly has inefficiencies in its routines, resulting in the creation of dataless areas of RAM. The engine 30B seeks to identify these areas. However, the algorithm by which the engine 30B functions, must also take into account that dataless areas can also arise for other reasons. For example, a process PROC 1 etc. might require access to a scratch pad for recording current values of variables, or the state of flags set during execution. These areas of RAM might initially be set to contain only zeros, thus appearing dataless.

Consequently, the engine 30B will first look through the RAM 20 to identify any areas which appear to be dataless. Each time an apparently dataless area is located, its location will be recorded by the engine 30B, for future reference. In FIG. 4A, for example, a relatively large area is apparently within process PROC 2 and containing only zeros, thus apparently being dataless. Smaller areas containing zeros are evident within process PROC 3. In a real example, many more apparently dataless areas are likely to be located.

Once all of these dataless areas have been identified, the engine 30B can then analyse them to determine which are indeed dataless and which only appear so. For example, the engine 30B may disassemble the whole of the software, and assess the disassembled listing, looking for any instructions which call those areas identified as apparently dataless, or any instructions which jump to those areas, or instructions which read or write to these areas. If any such instructions identify those areas, it is likely that the corresponding area is to be used by the software, for instance as a scratch pad. The area is therefore removed from the list of apparently dataless areas, because the area will be used for data, at least intermittently, during execution of the software.

Once each of the apparently dataless areas has been checked in this manner, the engine 30B can begin to make use of the dataless areas. In this example, it is assumed the two areas within process PROC 3 are found to have call or jump instructions identifying them and are thus removed from the list of dataless areas, whereas the area within process PROC 2 remains on the list.

The dataless area within process PROC 2 is then filled by the engine 30B inserting one or more of the functions of the block 38, which may be security checks or the like, and by executable code representing a decryption algorithm. This filling, beginning at line 1,300, is illustrated in FIG. 4B by shading.

In order to make use of the block of code now created at line 1,300, the engine 30B then modifies blocks of data elsewhere within the software, such as at line 800 within process 1. The contents of the section beginning at line 800 are read by the engine 30B. This includes an encryption algorithm which is used to encrypt the original contents of the area. The encrypted version is then written back to the area beginning at line 800. This is illustrated at FIG. 4B as a set of encrypted data E. The encrypted data is preceded by a call instruction C inserted by the engine 30B.

The call instruction C calls the code at line 1,300. Consequently, when execution of process PROC 1 reaches line 800, line 1,300 is then called, security functions are executed, and then the decryption routines of the area at 1,300 are executed. These decryption routines are written to act on the area from which the call was made, thereby reversing the operation of the engine 30B to decrypt the area at line 800 and write the decrypted part of process PROC 1 back to the area at 800.

Once the decryption routine from the area at 1,300 has executed, control returns to the source of the call (line 800) allowing the decrypted code to be executed.

If the ENGINE 30B does not find sufficient dataless areas within the software for embedding all of its functions, additional functions are written at line 3,200.

This example can be explained in further detail by considering the following table, showing line numbers in the left column, hexadecimal machine code bytes in the middle column, and disassembled instructions in the right hand column:

TABLE 1

| :01007B45 | 55   | push ebp      |
|-----------|------|---------------|
| :01007B46 | 8BEC | mov ebp, esp  |
| :01007B48 | 51   | push ecx      |
| :01007B49 | 53   | push ebx      |

TABLE 1-continued

| :01007B4A | 56       | push esi                    |
|-----------|----------|-----------------------------|
| :01007B4B | 33F6     | xor esi, esi                |
| :01007B4D | 57       | push edi                    |
| :01007B4E | 56       | push esi                    |
| :01007B4F | 8975FC   | mov dword ptr [ebp-04], esi |
| :01007B52 | E806F8FFFF | call 0100735D             |
| :01007B57 | 8975FC   | mov dword ptr [ebp-04], esi |
| :01007B5A | E853F8FFFF | call 010073B2             |
| :01007B5F | 8945FC   | mov dword ptr [ebp-04], eax |
| :01007B62 | FF30     | push dword ptr [eax]        |
| :01007B64 | E8E0F7FFFF | call 01007349             |

It can be seen that the short section of listing in Table 1 contains three call instructions, as will frequently arise within a complex piece of software. Each call instruction consists of the two bytes E8, followed by four bytes giving the address called.

Table 1 thus shows the true listing of the protected software, such as a section beginning at line 800, within process PROC 1.

When the engine 30B has inserted a call instruction, as described above, for instance at line 01007B45, the following list results:

TABLE 2

| :01007B45 | E8XX XX XX XX | call xx xx xx xx            |
|-----------|---------------|-----------------------------|
| :01007B4A | 56            | push esi                    |
| :01007B4B | 33F6          | xor esi, esi                |
| :01007B4D | 57            | push edi                    |
| :01007B4E | 56            | push esi                    |
| :01007B4F | 8975FC        | mov dword ptr [ebp-04], esi |
| :01007B52 | E806F8FFFF    | call 0100735D               |
| :01007B57 | 8975FC        | mov dword ptr [ebp-04], esi |
| :01007B5A | E853F8FFFF    | call 010073B2               |
| :01007B5F | 8945FC        | mov dword ptr [ebp-04], eax |
| :01007B62 | FF30          | push dword ptr [eax]        |
| :01007B64 | E8E0F7FFFF    | call 01007349               |

Consideration of Table 1 alongside Table 2 shows that the call instruction inserted as the first line of Table 2 does not appear extraordinary in any way. Thus, identifying calls to the security functions in order to disable those security functions becomes a task of such enormous complexity as to be unlikely to be achievable in practice. For example, even if a potential hacker realised that security functions had been embedded within the software, it would be necessary to work methodically through every call instruction within the software, in order to identify which, if any, were calling the security functions, in order to disable them. A machine code listing of a complex modern software application will include a very large number of call instructions.

It will be apparent from the above description that Table 2 illustrates the intermediate stage at which the call instruction (C in FIG. 4B) has been inserted, but the following section of code has not been encrypted.

It can also be understood that a few lines of legitimate code are over-written by the new call instruction These lines can be recorded within the security function, to be recreated when the security function runs, or alternatively, call instructions to a particular security function can be used only in place of particular target lines of code, so that on each occasion a particular security function is called, the same code will be required to replace the call instruction.

It will also be apparent that a call instruction should not be written over a block of code to which a call might legitimately made from elsewhere within the software, which would have the effect of causing the software to fail.

Consequently, the engine 30*b* is configured to look for locations at which the call instruction can be written, to identify any such locations in a manner described above in relation to the identification of apparently dataless areas.

EXAMPLE 4

FIGS. 5A and 5B illustrate a further protection arrangement with some similarities to the arrangement of Example 2. In particular, a protection block 40 is again used.

FIG. 5A illustrates the initial condition when the protected code has been loaded to RAM 20 from the drive 18. In this example, the protected code is a program which is loaded at 42, the start point of which is noted at 28 by the processor 12. In this example, for illustrative purposes only, the start point is indicated as memory location 10,000.

In addition to installing the program 42, the operation of downloading from the drive 18 also installs the protection block 40 starting, as illustrated in FIG. 5A, at memory location 12,000. The protection block 40 incorporates an ENGINE 44, for reasons to be explained. Calls to the block 40 are written into the program 42 in a manner similar to the process described above in relation to Example 2.

The protection block 40 operates in a manner similar to the block 38 of FIG. 3D. That is, the program 42 will jump to the block 40, for corruption to be assessed.

A protection jump of this nature might be considered vulnerable to attack and disabling by a malevolent watcher or virus which watches for calls, identifies calls which regularly go to a memory location which contains code which itself appears to be some form of protection code, and then disables the call instruction by overwriting.

In this example, this type of attack is hindered as follows. When the first call instruction to the protection block 40 is encountered, the protection block runs to make the corruption assessment and when that has successfully finished, the engine 44 runs. The ENGINE 44 performs two functions. In one, the engine 44 re-writes the call instructions within the program 42 to refer to a different memory location, such as 13,000 in this example. Prior to doing this, the ENGINE 44 executes a procedure to ensure that sufficient empty memory exists at location 13,000 to accommodate the block 40. The other function of the engine 44 is to recreate the protection block 40 (and itself 44), beginning at memory location 13,000. The protection block 40 has therefore moved, and the call instructions to memory location 12,000 have been overwritten by instructions to call location 13,000. In consequence, the call instructions to the security functions can be continually changing while the program 42 is running, thus greatly increasing the difficulty of a malevolent user or virus recognising and disabling calls to the protection block 40.

For example, if a hacker believes they have identified the location of the security code, by analysing calls to that location, the hacker may write a simple piece of code to identify all calls to that location, and disable them. However, that solution will not apply generically to all copies of a particular piece of software, because each will have its security block in a different place.

The relocated protection block 40 is illustrated in FIG. 4B.

EXAMPLE 5

Figure 6A:
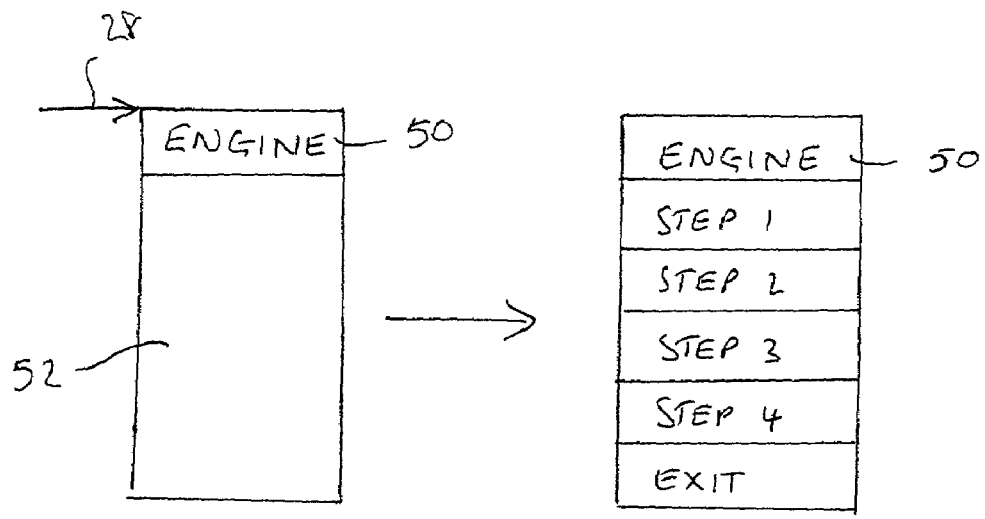
FIG. 6 illustrates the use of RAM in accordance with the invention and incorporating a self-modification arrangement.
Figure 6B:
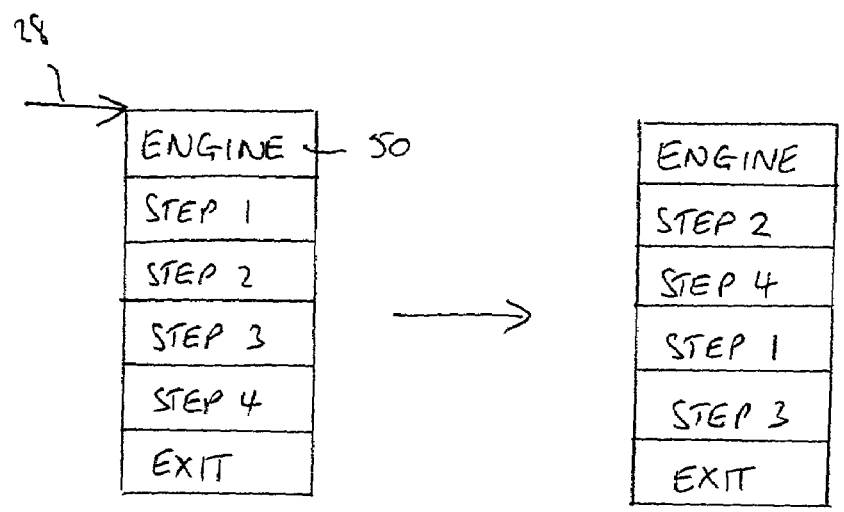

FIGS. 6A and 6B illustrate a further example of data protection. In this example, an ENGINE 50 is used to create a block of code in an empty RAM section 52 in a manner similar to that described above in relation to Example 1 and FIGS. 3A and 3B. Thus, when the protected code is first loaded from the drive 18 to RAM 20, the position to the left of FIG. 6A pertains, in which the engine 50 is installed in RAM, the remainder of which is empty at 52. In this example, the engine 50 is located at the start point of a sub-routine or other subsidiary operation within a main program. When that sub-routine is called, the ENGINE 50 is executed to create steps to fill the region 52. The position then pertains as shown to the right of FIG. 6A, with four steps, STEP 1, STEP 2, etc. in numerical order within the region 52. When the ENGINE 50 has run, the steps (STEP 1 etc) will then run, to execute the sub-routine.

FIG. 6B illustrates the situation when the sub-routine is next called. Initially, as shown to the left of FIG. 6B, the RAM 20 will be in the state left at the end of the first execution of the sub-routine, as illustrated to the right of FIG. 6A. In particular, the ENGINE 50 is still present, at the start of the block of code. Consequently, when the sub-routine is next called, the ENGINE 50 will again execute. However, the ENGINE 50 is written to create the steps in a different order on each occasion, preferably at random or pseudo-random. This can be achieved without adversely affecting the execution of the sub-routine, because many conventional routines, such as a PRINT statement, may be several thousand lines long when written in machine code, virtually any of which lines can be executed in virtually any order. If there are groups of lines which must be written in a particular order, those lines can be treated as a block, and written as a single step, so that the order within that block is preserved, but the position of that block changes on each execution of the ENGINE 50.

One or more of the STEPS can be written to implement or call a protection routine against virus attack or corruption. If so, that STEP will appear at a different position each time the sub-routine is run. Thus, a malevolent watcher will see code which is continuously changing and is therefore difficult or impossible to analyse in order to locate the protection, for disabling it. Alternatively, if a malevolent watcher recognises a step as being involved in protection, and disables it, such as by overwriting that step, the malevolent intervention will itself be overwritten on the next occasion the sub routine is called, by operation of the ENGINE 50, thus restoring operation of the protection.

EXAMPLE 6

Figure 7A:
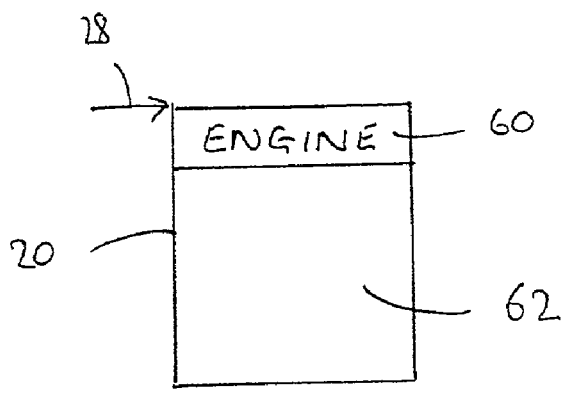
FIG. 7 illustrates the use of RAM in accordance with the invention and incorporating arrangements for partial decryption of protected data.

When the RAM 20 is in the condition shown in FIGS. 3B or to the right of FIGS. 6A and 6B, the full protected data is visible in decrypted form. It is envisaged that the forms of protection described above will nevertheless protect the code, but it is also recognised that in some circumstances, the exposure of the complete unencrypted code may represent a point of weakness in the protection, however transitory that exposure might be. A further example illustrates how this difficulty can be overcome. Again, FIG. 7A begins with the RAM 20 in the condition illustrated in FIG. 3A, with an ENGINE 60 at the start point of a sub routine, and the RAM 20 being otherwise empty at 62.

Figure 7B:
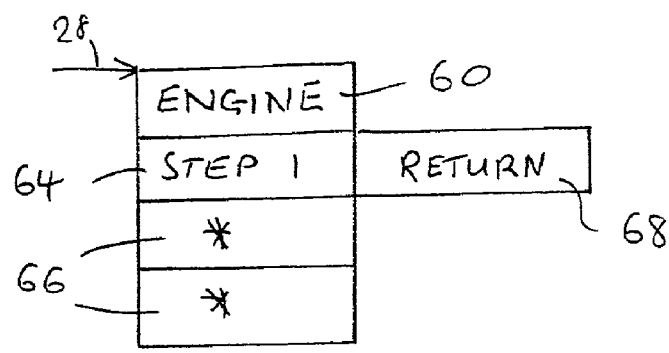
Figure 7C:
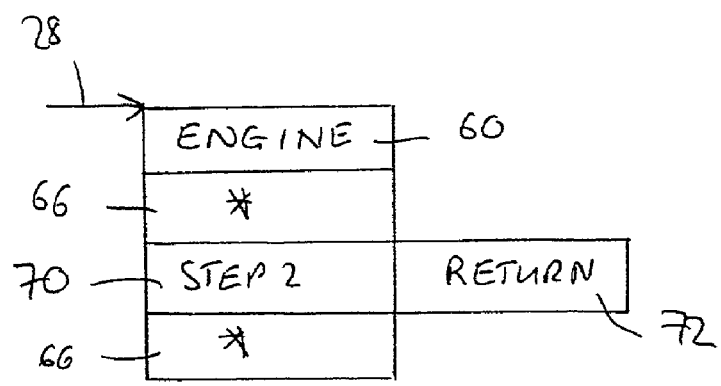
Figure 7D:
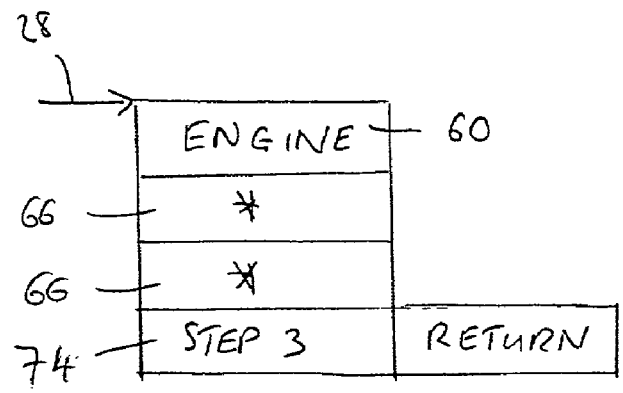

When the sub-routine is called, the processor 12 goes to the start point 28 and begins executing the ENGINE 60. On the first execution of the ENGINE 60, three blocks of code are created within the space 62 (in this example; the number 3 is chosen to illustrate the principles of the invention, not to limit the scope of the invention). These blocks are shown at FIG. 7B. Thus, at FIG. 7B, STEP 1 has been created at 64, followed by two blocks 66 of corrupt or meaningless data illustrated by asterisks. Alternatively, the blocks 66 could be left empty but it is envisaged that the creation of corrupt or bogus data may cause a malevolent watcher or virus more difficulty by providing a greater amount of code for analysis.

STEP 1 as created by the ENGINE 60 finishes with a RETURN statement 68 which returns execution to the beginning of the ENGINE 60. Thus, having executed STEP 1, the ENGINE 60 executes again. The ENGINE 60 will have set a register to record that a first execution has already taken place. Thus recognising that a second execution is underway, the ENGINE 60 creates STEP 2 at 70, together with corrupt blocks 66 before and after the block 70.

Again, the blocks 66 could be left blank.

STEP 2 can now be executed followed by a return at 72 to the ENGINE 60. A third execution of the ENGINE 60 then creates STEP 3 at 74, and two corrupt blocks 66, allowing STEP 3 to be executed.

Consequently, by repeated operation of the ENGINE 60 in this manner, the complete sequence of STEP 1; STEP 2; STEP 3 can be executed by the processor 12 but at no time is the full sequence visible from RAM 20, thus rendering it difficult or impossible to analyse this sequence or to corrupt it or disable it or any protection it contains. Again, a malevolent watcher will see a code which is continuously changing (or "mutating") and is thus virtually impossible to analyse adequately to attack.

Further examples can now be described, particularly suited to enhance protection against hackers who use debugger software. A hacker will often make use of debugger software in order to attack the security of software. Debugger programs are primarily intended for the legitimate operation of checking for faults in complex software. Debugger programs generally operate by inserting an interrupt command at a point in the software which the operator wishes to review. When execution of the software reaches the interrupt command, control is handed to the debugger program, which then looks at the next block of code, presenting the results to the operator in high or low level language, allowing the operator to check that block before allowing execution of the main program to continue.

One approach used by a hacker seeking to circumvent security routines is to use a debugger program to look for points within the main program at which security procedures are invoked. Jump commands are inserted at that point in order to jump over those routines when the main program is executed. Much modern software is sufficiently complex that the task of locating these points within the main program is arduous, but nevertheless, a skilled and determined hacker is likely to be able to find them eventually. Once found, the hacker can disable the security routines, which renders even the most sophisticated routine ineffective.

EXAMPLE 7

FIG. 8 illustrates a further example of implementation of the invention. In FIG. 8, the RAM 116 is shown to contain two blocks of software 120, 122. The first block 120 is the software protected by the arrangement of the invention. The block 122 is a security block which implements the protection arrangements. The protected software 20 includes an application 24 (such as a word processor application) at 24, headed by a security header 26.

The application 124 will be stored in encrypted form, and may also be compressed. Consequently, the application 124 cannot be used until it has been converted to an executable form, under control provided by the security header 126 under a previous proposal, which causes the application 124 to be decrypted and decompressed after making various security checks, such as to check software licence details held within the computer system, details of the user, the current date and time (in the event the software is licensed for a specified period), and the like. Once those checks had been successfully completed, the header 126 decrypts and decompresses the application 124 and moves the program pointer of the processor to the beginning of the application 124, thereby handing control to the application 124. This type of protection can be effective in many circumstances, but is vulnerable to a hacker circumventing one or more of the checks made by the security header 126 by inserting JUMP commands, as described above, thereby enabling the application 124 to be run without all of the normal security checks having been made.

The security block 122 is provided to address this deficiency.

The security block 122 is a block of code which provides two principal functions. First, one or more security checks of the type normally provided by a security header 126 are made when the block 122 is executed. These checks may duplicate checks made by the header 126, or be in addition to them. The manner in which security checks are divided between the security header 126 and the block 122 can be varied widely and is not itself an important aspect of the invention.

However, in this example, the function of decrypting the application 124 is no longer instructed by the header 126, but is under the control of the block 122. Decryption of the application 124 is preferably the final act of the block 122 when executed, following which control is handed from the block 122 to the decrypted application 124.

In this way, decryption of the application 124 cannot occur unless the block 122 successfully reaches the end of its procedures, allowing decryption to be authorised and implemented.

The security block 122 is therefore a likely target for a hacker seeking to circumvent the protection provided by the invention. A successful attack on the block 122 is prevented as follows.

The security block 122 is initially (prior to execution) held in encrypted form. Encryption is by means of an encryption algorithm which requires at least one conversion key for decryption. Many encryption algorithms are known which require conversion keys for decryption. Conversion keys are commonly numerical or are used in a numerical fashion within the algorithm after conversion to numerical form, such as from machine code values of alpha-numeric characters forming the conversion key. One class of algorithms which can be used with the invention are known as CRC (cyclic redundancy check) algorithms. A CRC algorithm assesses a target block of code to produce a numerical value which is characteristic of the target block. Thus, a simple CRC algorithm might add together the machine code values of each character of the target block of code. Other CRC algorithms could be much more sophisticated than a simple addition process. However, it is important to note that each time the CRC algorithm is applied to the target block of code, the same value will be returned, whereas any change within the target block will cause a different value to be returned.

In this example, the security block 122 is held in encrypted form by use of a CRC encryption algorithm. A decryption step is thus required when the block 122 first runs. This decryption seeks to decrypt the remainder of the block 122 from a non-executable to an executable form. This is achieved by executing a decryption routine based on a conversion key which is derived as a CRC value from a target block. The target block is preferably the encrypted block 122.

The consequences of these arrangements can be best understood by explaining the sequence of events when the application 124 is called.

Initially, the program pointer of the processor 12 will be pointed at the beginning of the security header 126, which will execute security checks before handing control to the block 122. At this stage, the application 124 is still in encrypted form. The block 122 is also in an encrypted form and is first decrypted. Decryption is achieved by an algorithm which requires a conversion key. The conversion key is the CRC value derived from the block 122 itself. If the block 122 has not been modified, an appropriate CRC value will be returned to allow conversion. The block 122 can then run normally, as a result of which, the application 124 will be decrypted by operation of the block 122. After the block 122 has fully executed, control will be handed to the application 124, which then runs in the normal manner. However, in the event that the block 122 has been modified in any way, the CRC value of the block 122 will have changed. As a result, the value used as a conversion key in the decryption algorithm will not be appropriate for correct decryption. The decrypted version of the block 122 will be corrupt. In any real situation, it is expected that any change to the conversion key would cause sufficient corruption as to prevent any further execution of the block 122. This would leave the application 124 in encrypted form.

Any attempt to use a debugger program to analyse the block 122 will cause the introduction of interrupt commands within the block 122, as has been described above. The act of using the debugger to look at the block 22 will therefore itself change the CRC value of the block 122, even before the debugger is used to make changes. The change to the CRC value will prevent the application 124 from being decrypted. Thus, operation of the application 124 is prevented by an attempt to watch at the security provided by the block 22, even if no modification of the security block is made as a result of the inspection.

A hacker seeking to circumvent security will be most interested in looking at those blocks of code which appear to be responsible for security checks. It is therefore preferred that the target block used for producing a CRC value for decryption of the security block 122 includes at least part of the block which conducts one or more security checks prior to authorising decryption of the application 124. Thus, all of these security checks could be executed by the decrypted block 122, in which case, the CRC conversion key could be derived from all or part of the encrypted block 122. Alternatively, some checks could be executed by the block 124, in which case the CRC value could be derived wholly or partly from all or part of the header 126.

EXAMPLE 8

FIG. 9 illustrates a more complex alternative to Example 7. Many features illustrated in FIG. 9 correspond with the features of FIG. 8, and like numerals are used for these features.

The principal difference between the implementations of FIGS. 8 and 9 is the manner of encryption of the security block 122. The block 122 is illustrated as a plurality of sub-blocks 130. The sub-blocks 130 together provide an encrypted form of the block 122, but each sub-block 130 is separately encrypted. Each may be encrypted by the same algorithm and a respective conversion key, or by different algorithms, each requiring the same conversion key, or by different algorithms requiring different conversion keys.

When the example of FIG. 9 is run, the sequence of operations is largely the same as that described above in relation to FIG. 8, except as follows. When the block 122 is first called, a decryption algorithm is executed to decrypt only the uppermost sub-block 130. This may be by means of a CRC value of the sub-block being decrypted, or another sub-block, or a target block elsewhere (such as all or part of the security header 126). After decryption, the first sub-block 30 can then be executed. This may implement security checks, or other initial routines. Execution of the first sub-block 130 concludes with an instruction to decrypt the second sub-block 130. This is achieved by a decryption algorithm requiring a conversion key which will preferably be derived at the time of decryption, even if the conversion key is the same as the conversion key used for decrypting the first sub-block 130. Thus, any interference in the target block since decryption of the first sub-block will cause a change in the CRC code, and thus cause corrupt decryption of the second sub-block 130.

These operations are illustrated more fully in FIG. 10. FIG. 10 illustrates three lines of code at the boundary between the first and second sub-blocks 130A, 130B. Sub-block 130A concludes at line 99 with a final line, the nature of which is not important to the invention. Line 100 is then executed. This is a decryption instruction. The instruction specifies the block of data to be decrypted, here lines 101 to 200, which represent the second sub-block 130B. Instruction 100 also identifies the algorithm to be used, here algorithm A. Finally, instruction 100 identifies the conversion key to be used by specifying the lines (here specified as lines 101 to 200) to be used as a target block to derive a conversion key for use within algorithm A.

Once line 100 has been executed, execution will move to line 101. In the event that line 100 achieved successful decryption, line 101 will correctly indicate the first action of the second sub-block 130B. Successful decryption would occur if the sub-block 130B had not been modified, so that the correct CRC value was used as a decryption key. However, if the second sub-block 30B had been modified, or was being inspected by a debugger program at the time the CRC value was being calculated, the wrong CRC value would be used for decryption at line 101, the sub-block 130B would be corrupt, and execution would cease at that point. This would leave the application 124 in encrypted form.

As execution of the security block 122 continues, each sub-block 130 is decrypted in its turn by the preceding sub-block, in the manner just described and as indicated by the arrows 132 in FIG. 9. In the event that there is no corruption in the block 122, and a debugger program is not being used, the block 122 will fully decrypt in uncorrupted form, and execute successfully, reaching the end of the final sub-block 130, illustrated in FIG. 11. At the end of the final sub-block 130, that is, at the end of execution of the block 122, there is an instruction (line 998) to decrypt the application 124, followed by an instruction (line 999) to go to the application 124. The decryption at 998 can be based on an algorithm requiring a decryption key derived as a CRC value as described above, in order to further apply the principles of the invention. Line 999 will only be reached and executed correctly if every sub-block 130 has been correctly decrypted.

EXAMPLE 9

Examples 7 and 8 described above assume that execution of the software commences with the security block 122 separately installed in the RAM 20, as illustrated in FIGS. 8 and 9. The third example, illustrated in FIGS. 12A and 12B includes a further decryption and decompression step, as follows.

Figures 12A, 12B:
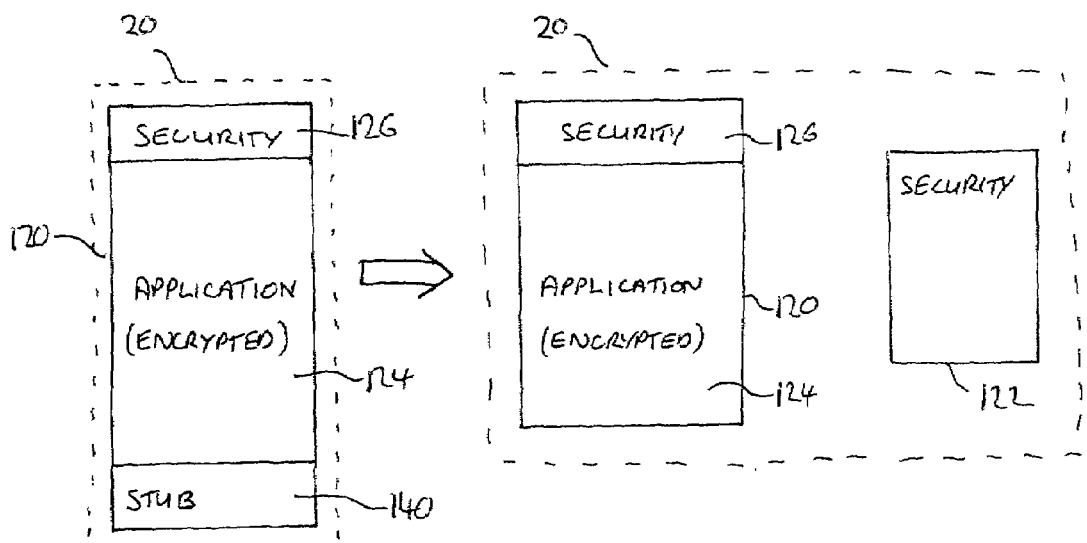

Initially, the RAM 20 includes a single block of software 120A (FIG. 12A). This incorporates the encrypted application 124, the security header 126, and a security stub 140, illustrated in this example as attached to the end of the application 124. The security stub 140 incorporates a compressed and encrypted version of the security block 122 of Examples 7 or 8. The security header 126 includes an instruction to decrypt and/or decompress the stub 140 and to install the result as a separate block, forming the security block 122 (FIG. 12B). When the security header 126 has fully executed, control will then pass to the security block 122. Subsequent execution will proceed as described above in relation to Example 7 or Example 8.

An advantage of this example is to allow the stub 140 to be provided as part of the software licensed to a legitimate user, so that the block 120 as illustrated in FIG. 9A will be installed, including the stub 140, when the licensed application is installed. This ensures that a properly licensed version of the application 124 is always accompanied by the security stub 140, thus ensuring that the authorised copy remains protected by the benefits of the software protection arrangements of the invention.

In particular, many different algorithms for decryption and for calculation of CRC values could be used in these examples.

SUMMARY

In each of the examples described above, the code within RAM changes during execution of the executable code. In the simplest example (Example 1) the code changes once, to create a routine. In other examples, the code changes more often and in several examples, a malevolent watcher will see a code which appears to change continuously.

In each case, the protected data is initially not available in usable form. However, other executable code is associated with the protected code, and incorporates information about the protected data. This may be information relating to its location, encryption technique or key, the location of the encryption key, or the whole code in encrypted form. This allows the further executable code to create further code which releases the protected code from the protection, allowing the data to be accessed in usable form.

Very many variations and modifications can be made to the arrangements described above. In particular, it will be readily apparent from a full understanding of the description set out above, that various techniques described there can be used together, in various combinations. For instance, the principle of relocation described in connection with Example 3 can be incorporated into Example 5 so that in addition to the steps of Example 5 being created only temporarily, the location at which they are created can be changed, preferably at random, or pseudo-randomly.

In the examples set out above, the protected data has been executable, but the techniques can readily be adapted to protect a non-executable data file.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Computer software operable to provide protection for a second item of computer software, the protection software comprising security means operable to authorise execution of the protected software in response to successful completion of one or more security checks, and having at least one block of executable code which is stored in non-executable form and which requires execution to authorise execution of the protected software, and the protection software further comprising conversion means operable to convert the said block of code to an executable form by means of an algorithm which requires at least one conversion key, the conversion means being further operable to derive a conversion key, for use in the algorithm, by reference to a target block of code in executable or non-executable form, whereby an appropriate conversion key will be derived only if the target block is unmodified.

2. A computer memory device containing computer software in accordance with claim 1.

3. A computer system containing an item of computer software protected by means of computer software in accordance with claim 1.

4. A digital data arrangement comprising protected code and security code, wherein the protected code comprises incomplete executable code, the executable code including one or more call instructions to the security code, and the security code, when executed, replaces a respective call instruction with executable code such that the executable code of the protected code is completed upon execution of all call instructions.

5. A computer system comprising memory means containing a digital protection arrangement according to claim 4.

6. A data carrier containing software which, when installed on a computer system, is operable as a digital data protection arrangement in accordance with claim 4.

7. Computer software which, when installed on a computer system, is operable as a digital data protection arrangement in accordance with claim 4.

8. The arrangement of claim 4, wherein the security code, when executed, is operable to detect corruption of the protected code.

9. The arrangement of claim 8, wherein the security code is operable to delete the protected code in the event that any corruption is detected.

10. The arrangement of claim 4, wherein the protected code comprises encrypted code associated with each call instruction and the security code, upon execution by a call instruction, is operable to decrypt the associated encrypted code and to replace the call instruction and encrypted code with corresponding decrypted code.

11. The arrangement of claim 4, wherein the security code is embedded within the protected code.

12. The arrangement of claim 11, wherein the security code is embedded at locations which are unused by the protected code.

13. The arrangement of claim 12, wherein at least one embedding location is identified when the protected code is executed, the security means is written to the embedding location.

14. The arrangement of claim 13, wherein an embedding location is identified by decompiling the protected code, and analyzing the decompiled code.

15. The arrangement of claim 4, the arrangement further comprising relocation code operable to change the location of the security code and to modify the call instruction to refer to the new location.

16. The arrangement of claim 15, wherein the relocation code is contained within the protected code, to operate repeatedly while the protected code is in use.

17. The arrangement of claim 4, wherein the protected code is provided in encrypted form, and the arrangement further comprises executable instructions for decryption.

18. A digital data arrangement comprising:
protected data provided in encrypted form;
decryption instructions for decrypting the protected data, the decryption instructions being provided in a non-executable form; and
executable conversion code operable to: derive a conversion key from a target block of data of the arrangement; convert the decryption instructions into an executable form by means of an algorithm that employs the conversion key; and execute the decryption instructions to decrypt the protected data, wherein the decryption instructions are converted into an executable form only in the event that the target block of data is unmodified.

19. The arrangement of claim 18, wherein the decryption instructions comprise a plurality of blocks of executable code stored in non-executable form, each of which requires execution to decrypt the protected data, and the conversion code is operable to convert each block into an executable form.

20. The arrangement of claim 19, wherein conversion of each block is achieved by a respective conversion key derived from a respective target block.

21. The arrangement of claim 19, wherein at least one block is operable, upon execution, to convert another block into an executable form for subsequent execution.

22. The arrangement of claim 21, wherein each block is operable, upon execution, to convert another block to an executable form for subsequent execution.

23. The arrangement of claim 18, wherein the or each target block is contained within the protected data.

24. The arrangement of claim 18, wherein the or each target block is contained within the decryption instructions.

25. The arrangement of claim 18, wherein the or each algorithm for converting code is a CRC algorithm.

26. The arrangement of claim 18, wherein the protected data contains executable code and/or a data file.

27. The arrangement of claim 18, comprising processing means operable to execute code, and memory means storing the protected data, decryption instructions and conversion code with a start point at a memory location indicated within the arrangement as the start point for the protected data, whereby the processor means will cause the executable conversion code to be executed when seeking to access the protected data.

28. A data carrier containing software which, when installed on a computer system, is operable as a digital data protection arrangement in accordance with claim 18.

29. A digital data arrangement comprising executable code executable to create protected data, wherein the protected data contains at least one executable instruction which contains a plurality of steps, the steps being executable in more than one order to implement the instruction, and the executable code being operable to create the protected data by creating the steps in an order which changes on each execution of the executable code.

30. A data carrier containing software which, when installed on a computer system, is operable as a digital data protection arrangement in accordance with claim 29.

31. The arrangement of claim 29, wherein the order of the steps is chosen substantially at random on each execution.

32. The arrangement of claim 29, wherein the steps include at least one step which initiates operation of security means operable to detect corruption of the protected data.

33. The arrangement of claim 29, wherein the executable code is executable to create the steps on each occasion that the executable instruction is to be executed.

34. A digital data arrangement comprising executable code executable to create a first part of protected code and to execute the first part of protected code, and to subsequently create a second part of protected code and to execute the second part of protected code, wherein the first part of protected code is corrupted upon creation of the second part of protected code.

35. The arrangement of claim 34, wherein each part corresponds to a complete executable routine within the protected code.

36. The arrangement of claim 34, wherein the executable code is executable to create corrupt data in addition to each part of protected code.

37. A data carrier containing software which, when installed on a computer system, is operable as a digital data protection arrangement in accordance with claim 34.

38. A digital data arrangement comprising protected code, security code and relocation code, wherein:
the protected code comprises at least one call instruction to the security code;
the security code, when executed, detects corruption of the protected code and executes the relocation code in the event that no corruption is detected; and
the relocation code, when executed, changes the location of the security code and modifies the call instruction to refer to the new location.

39. The arrangement of claim 38, wherein:
the protected code comprises a plurality of call instructions to the security code;
the security code, when called by a call instruction, detects corruption of the protected code and, in the event that no corruption is detected, replaces the call instruction with executable code and executes the relocation code; and
the relocation code, when executed, changes the location of the security code and modifies the remaining call instructions to refer to the new location.

40. A data carrier containing software which, when installed on a computer system, is operable as a digital data protection arrangement in accordance with claim 38.

* * * * *